April 1, 1947.  J. P. GRABSKE  2,418,403
DETACHABLE LOADER UNIT FOR TRUCKS AND TRACTORS
Filed March 26, 1945  3 Sheets-Sheet 1

INVENTOR
JOHN P. GRABSKE
BY
Wheeler, Wheeler & Wheeler
ATTORNEYS.

April 1, 1947. J. P. GRABSKE 2,418,403
DETACHABLE LOADER UNIT FOR TRUCKS AND TRACTORS
Filed March 26, 1945 3 Sheets-Sheet 2
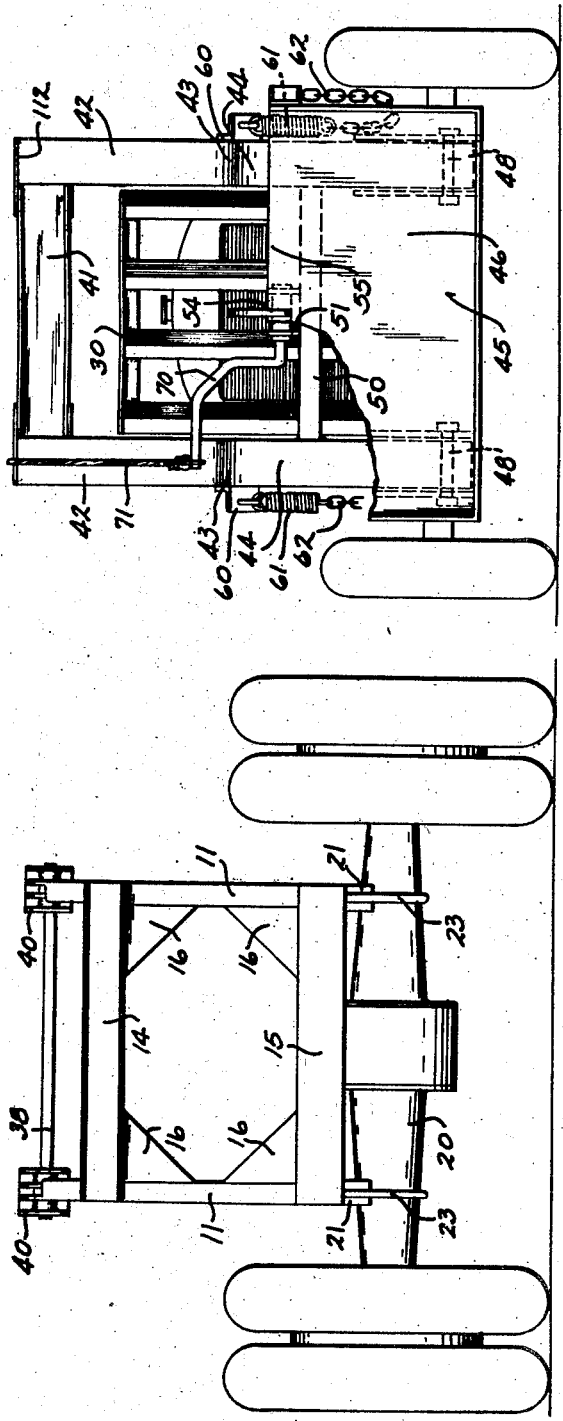
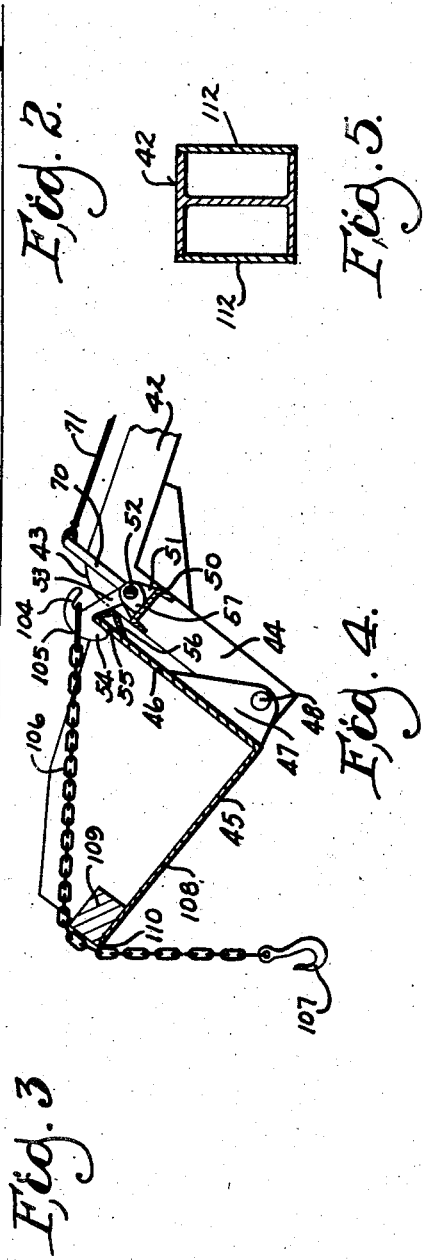
INVENTOR.
JOHN P. GRABSKE
BY
Wheeler, Wheeler & Wheeler
ATTORNEYS April 1, 1947.   J. P. GRABSKE   2,418,403
DETACHABLE LOADER UNIT FOR TRUCKS AND TRACTORS
Filed March 26, 1945   3 Sheets-Sheet 3
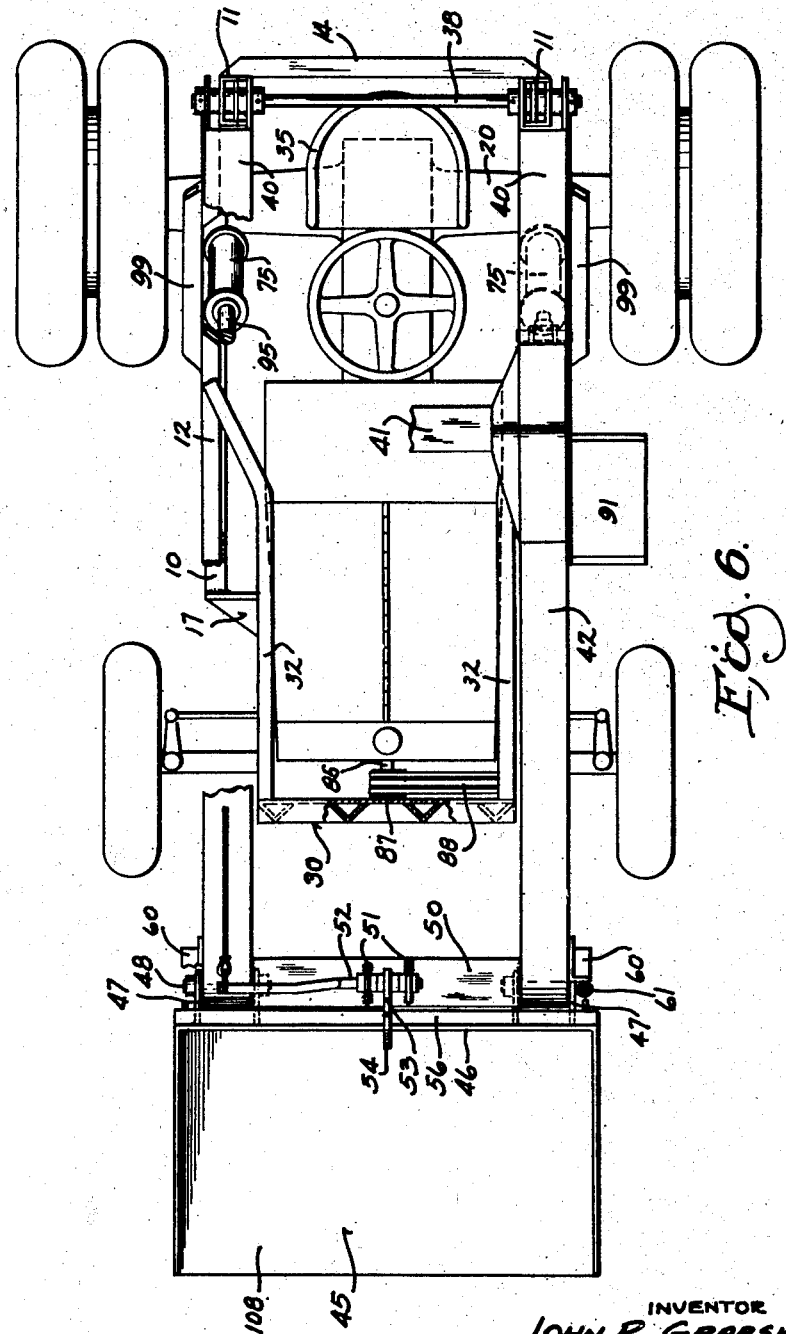
INVENTOR
JOHN P. GRABSKE
BY
Wheeler, Wheeler & Wheeler
ATTORNEYS Patented Apr. 1, 1947

2,418,403

UNITED STATES PATENT OFFICE 2,418,403

DETACHABLE LOADER UNIT FOR TRUCKS AND TRACTORS

John P. Grabske, Cudahy, Wis.

Application March 26, 1945, Serial No. 584,815

13 Claims. (Cl. 214—140)

1

My invention relates to improvements in detachable loader units for trucks and tractors, with particular reference to loader units of a type designed to operate loading devices at the front end of a vehicle.

A primary object of my invention is to provide a simple, sturdy and easily operable loader unit of the above mentioned type which can be quickly and easily attached to or detached from any ordinary farm tractor and used for digging, hoisting, loading, and other purposes in and about a farm or elsewhere.

Further objects are to provide a structure of the described type in which side sway will be eliminated and stability and safety promoted, with increased efficiency in operation, low head room, reduced interference with the visibility of the operator, proper distribution of load on the supporting vehicle, and capability of a wider range of usefulness than any structure known to the prior art.

A further object is to provide improved means whereby the resistance to the operation of a shovel or scraper is utilized to increase the load on the traction wheels of the supporting vehicle, whereby its pushing power is increased.

Further objects will be apparent from the following description and the accompanying claims.

In the drawings:

Figure 2 is a front elevation, with the loading shovel partially broken away and raised to the position which it occupies when being transported.

Figure 3 is a rear elevation.

Figure 4 is a fragmentary view, partly in elevation and partly in section, showing the shovel and associated parts as it appears when used as a crane.

Figure 5 is a sectional view drawn to line 5—5 of Figure 1.

Figure 6 is a plan view, with one of the side arms and the cross tie partially broken away.

Like parts are identified by the same reference characters throughout the several views.

Figure 1:
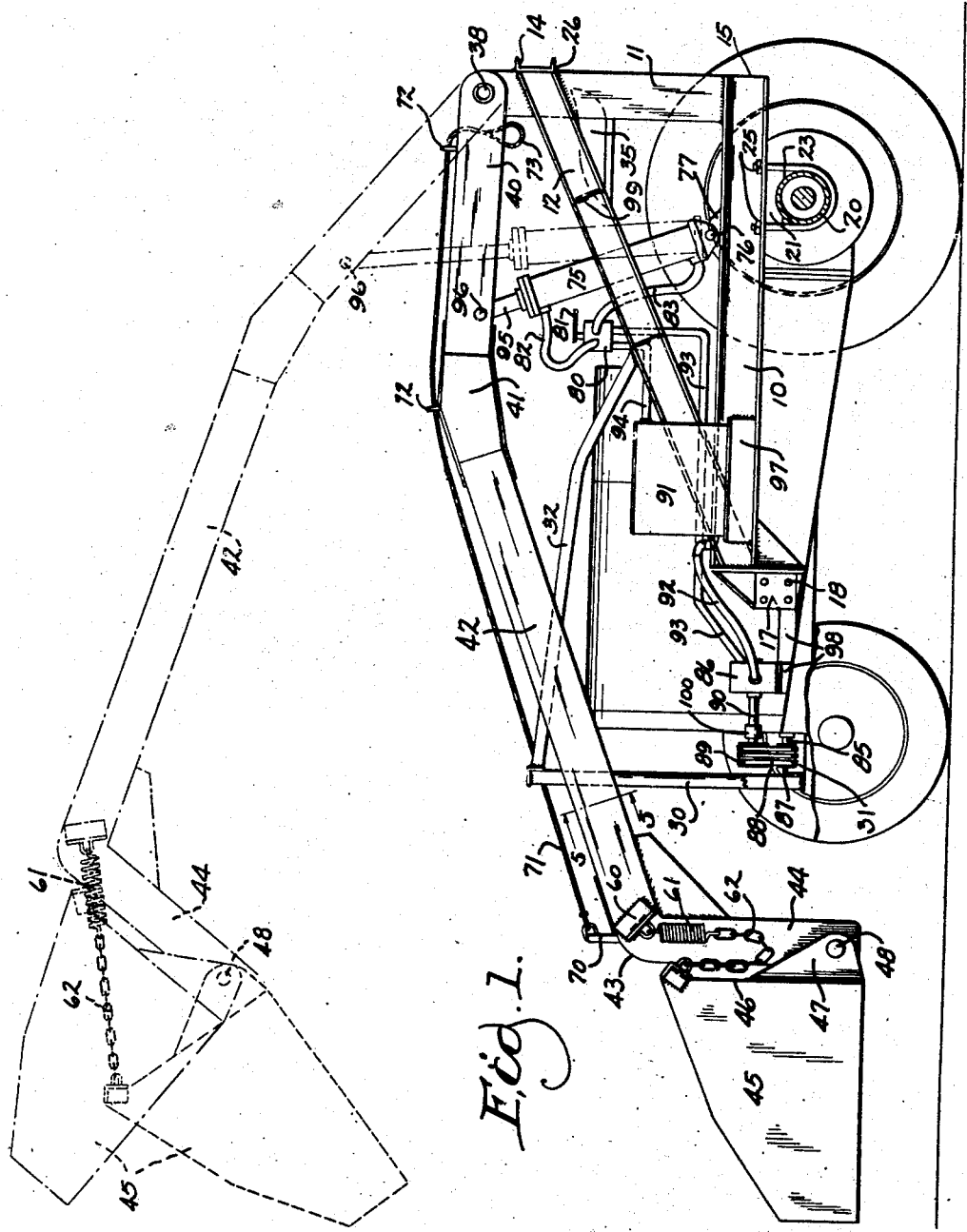
Figure 1 is a side elevation of my invention showing the same applied to an ordinary farm tractor, one wheel of the tractor being removed to fully expose the detachable frame of my improved unit.

As shown in Figure 1, my improved unit is provided with a supporting frame having triangular sides composed of a base bar 10, provided with an upright 11 at its rear end, the upper portion of which is connected with the front end of the base bar by an oblique brace 12. The uprights of the two side portions are cross-connected by upper and lower cross bars 14 and 15, with gussets 16 in the respective corners. All of these parts are rigidly connected or welded together to form a unitary structure of great strength and resistance to torsional stress, as well as to vertical, horizontal or lateral pressures. The top flange of the base bar 10 is cut away at its front end to allow the bar 12 to be welded to the vertical web of said bar 10.

As indicated in Figure 1, the front ends of the base bar 10 and the oblique bar 12 are mounted on a connecting bracket 17 to which the bars are welded, and which in turn is secured to the tractor body by bolts 18. The rear end portions of the base bars 10 are supported from the load bearing axle 20 of the tractor with resilient cushions 21 interposed, and are secured to the axle 20 by U-shaped coupling bolts 23, the upper ends of which pass through apertures in one of the flanges of the bar 10 and are secured to said flange by nuts 25. The base bar 10 preferably comprises an I-beam, whereas the bars 11, 12, 14 and 15 preferably have the form of channel bars, the upper and lower flanges of the cross bar 15 being fitted between the associated upper and lower flanges of the bar 10 and welded thereto, as best indicated at 26 in Figure 1.

The radiator guard 30 is mounted on a bracket 31 connected with the tractor body in any suitable manner (not shown), and the upper corners of this guard are connected with the oblique bars 12 by links 32. The bracket 31 may be left permanently connected with the tractor body but all the other parts of my improved unit may be removed by simply removing the bolts 18 and the nuts 25, whereupon the frame of the unit, including the radiator guard 30, may be lifted and withdrawn from the tractor.

It will be noted in Figure 1 that the rear end of my improved frame is disposed slightly to the rear of the tractor seat 35, whereby, except when a load is being lifted, an operator seated at 35 may have substantially as clear a view over the front end of the tractor as he may have when the loader unit is removed. This view is only momentarily interfered with by the operating mechanism during a load lifting operation.

A pivot shaft 38 is supported by the upper ends of the frame bars 11, and shovel operating side arms have rear end portions 40 pivoted to said shaft 38. The front ends of these portions 40 are cross-connected at 41, beyond which the shovel operating arms have oblique extensions 42, elbowed at 43, with terminal portions 44 which occupy substantially a vertical position when the parts are adjusted as shown in Figure 1.

A lifting bucket 45 has rear walls 46 provided with ear-shaped brackets 47 which are pivoted at 48 to the arm portions 44, as best shown in Figure 1. The upper ends of the arm portions 44 are cross-connected by a channel bar 50, (Figure 4), and the central portion of this channel bar is provided with ear-shaped brackets 51 in which a pivot pin 52 is journaled. A latch arm 53 is fixedly secured to the pivot pin 52 and provided with a hook-shaped extremity 54 adapted to engage over the rear upper margin 55 of the bucket 45, whereby the bucket may be held in the load lifting position in which it is illustrated in Figure 4. An angle iron reenforcing bar 56 is welded to the upper marginal portion of the rear wall of the bucket.

When the bucket is in its Figure 4 position, its rear wall is substantially parallel with the lifting arm portions 44, reenforcing bar 56 being substantially in contact therewith. When the bucket is in the dumping position as shown by dotted lines in Figure 1, it will automatically be swung to loading position on contact with the ground. In moving to loading position, the oblique supper surface of the bar 56 lifts hook 54 and allows it to drop to latching position, the hook having been held in position for engagement by the bar 56 by a stop 57 on the latch arm 53.

Near the elbows 43 the operating arms are provided with laterally extending brackets 60 which are connected to the respective ends of the reenforcing bar 56 by coiled tension springs 61 and chains 62. These connections limit the downward movement of the bucket when it swings downwardly to dumping position, and the springs cushion the shock when the swinging motion of the bucket is arrested.

To dump the bucket, it is, of course, necessary to retract the latch hook 54 from the upper margin of the rear wall of the bucket, and to enable the operator to do this from the driver's seat 35, the latch carrying pivot pin 50 is provided with an arm 70 to which is attached a cable 71 supported at intervals along the bucket operating arm by staple-shaped retainers 72, and provided, adjacent the operator's seat, with a loop or hand hold 73, whereby the operator can retract the latch by pulling downwardly on the hand hold 73. When the bucket again swings downwardly, contact of its lower margin with any obstruction will automatically cause it to swing back to load receiving and relatched position as above explained.

The bucket operating arms are lifted and lowered by a pair of hydraulic jacks 75, each of which has its lower end pivoted at 76 to ear-shaped brackets 77 on one of the base bars 10 of the unit supporting frame. Power liquid may be delivered to either end of this jack and exhausted from the other end through a valve chamber 80, having its valve controlled by an operating handle 81. Flexible tubes 82 and 83 lead from the valve chamber to the respective ends of the jacks.

All ordinary tractors are provided with an engine driven shaft similar to that indicated at 85, whereby the tractor motor may be used to drive other mechanisms. This shaft may be used to drive a pump at 86 through pulley 87, belts 88, pulley 89 and shaft 90, whereby the pump may draw liquid from a storage tank 91 through pipe 92 and deliver it through pipe 93 to the valve chamber. An exhaust pipe 94 leads from the valve chamber back to the storage tank.

The plunger 95 of each hydraulic jack is pivotally connected at 96 to the portion 40 of its associated operating arm, whereby said arm may be lifted, as indicated by dotted lines in Figure 1. The cylinders of the hydraulic jacks 75 and their plungers 95 are preferably located directly underneath their associated arm sections 40, this being permitted by offsetting the diagonal brace 12, as best indicated at 99 in Figure 6. The storage tank 91 may be mounted on a bracket 97 connected with the base bar 10 of the unit frame, and the pump 86 may be mounted on an extension 98 of the bracket 17, whereby, when the unit frame is to be removed from the tractor, the shaft 90 may be uncoupled at 100 and the pump 86 and storage tank or chamber 91 removed with the unit frame.

In order to permit use of the hydraulically operated arms as a hoist or crane, I provide the latch arm 53 with an auxiliary hook 104 adapted to engage a ring 105 connected with a chain 106 which carries a hoisting hook 107. The chain 106 runs over the forward margin of the bottom 108 of the bucket and to avoid injury to the bucket I interpose a removable block 109 having a slot or recess 110, within which the plowing edge of the bucket may be engaged. When not in use, this block, with the chain 106 and hook 107, will be removed and stored on the tractor.

The arm portions 40, 42 and 44 preferably have the form of I-beams, with wide top and bottom flanges, connected for at least a portion of their length by welded plates 112 which convert these beams into box-beams with three vertical walls, as best shown in Figure 5. This, coupled with the reenforcement of the posts 11 of the triangular unit frame by the gussets 16 provides a structure of great rigidity and resistance to side sway. Tendency to side sway in the loading devices heretofore constructed has presented an exceedingly difficult problem which has been solved in the structure hereby disclosed, not only by the described reenforcements and the character of the beams employed, but by the connection of the unit frame with the tractor, whereby the body and axle of the tractor add to the stability of the unit.

Also, by mounting the pivot shaft 38 in the rear of the operator's seat and only a little below his line of vision, and by downwardly inclining the portions 42 of the lifting arms, the following important results are accomplished.

When filling the bucket by pushing it forwardly into material to be lifted, the backward thrust of the lifting arms shifts nearly the entire load of the tractor to the rear axles, the posts 11 of the triangular frame having sufficient leverage for this purpose.

Also, since the portions 40 of the lifting arms are then in substantially a horizontal position substantially at the level of the neck or shoulder of a person occupying seat 35, the driver can view the operation of the bucket and can steer the tractor as freely as if the attachment were not present thereon.

When lifting the bucket, the vision of the operator will be only momentarily obstructed, while the cross connections of the lifting arms, and also the bucket itself, are passing his line of sight. The dumping of the bucket is also in full view of the operator.

By making the sides of the shovel operating unit in the form of a right angled triangle with an elongated base securely anchored to the tractor body and the forward apex, the frame is given great pushing power and resistance to the strains imposed when lifting a loaded bucket.

I claim:

1. A detachable loader unit for power driven vehicles, having in combination a supporting frame, each side of which comprises a member having the general form of a right angled triangle with its base mounted on, and detachably secured to, the rear load bearing axle, and its forward apex also detachably clamped to the vehicle frame in the rear of the front wheels, the upright members of each side of said frame being located in the rear of the load bearing axle, bucket lifting arms pivoted to said upright portions of the frame and extending forwardly below the field of vision of the operator, arm lifting means connected with the base members adjacent to and in front of said rear axle, a bucket pivoted to said arms in front of the vehicle, latch means for normally holding the bucket in load receiving position, and means operable from the driver's seat for releasing the latch.

2. The combination set forth in claim 1, including a set of hydraulic jacks each pivotally mounted on the base of one of said triangular members and operatively connected with said lifting arms and normally in substantial alignment with the rear axle, a storage tank and pump, and a pump operating shaft adapted to be detachably connected with the vehicle motor.

3. A detachable loader unit for power driven vehicles, having, in combination, a supporting frame, each side of which comprises a member having the general form of a right angled triangle with its base mounted on, and detachably secured to, the rear load bearing axle, and its forward apex seated in a cup-shaped bracket also detachably clamped to the vehicle frame rearwardly of the front axle, the upright members of each triangular side of said frame being located in the rear of the rear axle and extending to a substantial distance above the seat level, bucket lifting arms pivoted to said upright portions of the frame and extending forwardly therefrom below the operator's horizontal plane of vision, hydraulic jacks each pivtoally mounted on the base of one of said triangular frame members in front of and adjacent to said rear axle and in a vertical plane which includes said base member and the associated lifting arm, each jack having a plunger pivotally connected with such arm, a bucket having a rear wall pivoted to said arms in front of the vehicle, latch means for normally holding the bucket in load receiving position, and means, operable from the driver's seat, for releasing the latch.

4. The combination set forth in claim 3, including resiliently yielding flexible connections between the lifting arms and the bucket, adapted to limit the dumping movement of the bucket about its pivotal connections and hold it in a position to automatically return to loading position when lowered into contact with an obstruction.

5. In a detachable loader unit for motor driven vehicles, the combination with lifting mechanism of a pivotally supported dumping bucket, hook-shaped le c. means for holding the bucket in load receiving position, an auxiliary hook on said latch, a load lifting chain adapted to be engaged with the auxiliary hook and to extend over the front edge of the bucket to a depending position beyond the bucket, and a load engaging hook connected with the depending end of said chain, whereby said loader unit may be used either as a lifting shovel or as a crane.

6. In a loader unit as set forth in claim 5, means for protecting the edge of the bucket from damage by said chain when the unit is being used as a crane.

7. A removable loader unit for power driven vehicles, comprising an upright rectangular frame composed of channel bars welded together and having welded gussets at the corners, forwardly extending I beams at the base of the frame, channel bar braces connecting the forward ends of the I beams with the top of the frame and welded thereto, said I beams being spaced to straddle the body between the rear wheels and provided with means for detachably connecting their rear ends with said rear axle and their front ends with a vehicle frame between its axles, bucket supporting lifting arms pivotally connected with the upper portions of said frame and extending forwardly above the respective I beams, and lifting jacks pivotally connected with the I beams in front of and adjacent to their axle connections and having forwardly and upwardly extending plungers pivotally connected with the lifting arms, said lifting arms extending forwardly below the horizontal plane of vision of an operator on the vehicle and having elbowed front end portions extending abruptly downwardly in front of the vehicle, a lifting bucket having the lower portion of its rear wall pivotally connected with said downwardly extending arm portions, latch means for connecting the upper margin to said arm portions, and means for releasing the latch from a point of remote control, said downwardly extending portions of the lifting arms being adapted to rigidly support the rear wall of the bucket during shoveling operations and to transmit the counter pressure and load to the rear axle of the vehicle through said frame during loading operations and through the jacks and frame during lifting operations.

8. In a shovel operating loader of the described class, a set of hydraulically operated lifting arms provided with means for pivotally supporting them from the rear portion of a vehicle, each of said arms being integral throughout its length and having its front end portions extending abruptly downwardly in front of the vehicle, in combination with a grab bucket having a rear wall normally substantially parallel with said downwardly extending arm portions and having its lower marginal portion pivotally connected therewith and its upper marginal portion in latch connection therewith marginal portion having a reenforcing bar positioned for bearing contact on said arms whereby said arms are adapted to push with substantially equal pressure against the top and bottom portions of the bucket during a loading operation.

9. A loader as set forth in claim 8 in which the lifting arms are of rectangular cross section, with top and bottom walls connected by three spaced vertical walls constituting a deep beam of great strength and rigidity and resistance to side sway.

10. A detachable loader unit for power driven vehicles, including the combination of a supporting frame adapted to be detachably connected with the rear axle an engine block of an ordinary vehicle provided with an internal combustion motor and provided with upright members in the rear of said axle, bucket lifting arms pivoted to said upright members and extending forwardly below the horizontal plane of vision of the operator of the vehicle, and arm lifting means connected with the base of the frame immediately in front of said axle connections, whereby the load imposed on the vehicle by the bucket may be transmitted through said arms to said axle and substantially balanced over the axle during a lifting operation.

11. A non-swaying shovel operating loader unit for detachable connection with ordinary trucks and tractors, comprising the combination with a pair of spaced I beams provided with means for detachably connecting their rear end portions to the load bearing axle of a vehicle and their front end portions with a vehicle frame between the axles, an upright channel bar frame provided with corner gussets and having its lower end rigidly connecting the rear ends of said I beams, obliquely disposed channel bars rigidly connecting the upper portions of said frame with the forward ends of the I beams, and bucket lifting arms pivotally connected with the upper portions of said channel bar frame, said lifting arms having elbowed down-turned front ends adapted for pushing engagement with the upper and lower margins of a lifting bucket and comprising hollow members having top and bottom walls and three spaced connecting walls in vertical planes, whereby to produce a non-swaying structure of great pushing strength and rigidity in proportion to its weight.

12. In a non-swaying loader unit of the described class, a set of elbowed pushing and lifting arms, each comprising an I beam provided with welded side wall plates parallel with its central web and spaced therefrom.

13. In a loader unit of the described class, a set of lifting arms pivotally supported at their rear ends and having front ends abruptly down-turned, a grab bucket having the lower portion of its rear wall pivotally connected with the lower ends of said arms, an angle iron reenforcement for the upper portion of the rear wall of the bucket having one flange extending downwardly and rearwardly from the margin of said portion, and hook-shaped latches carried by said arms in position to be automatically lifted by said inclined flange over the margin of the bucket wall to lock the same with its said reenforcement in contact with said arms for a bucket filling and lifting operation when the bucket is dropped to the ground after a dumping operation.

JOHN P. GRABSKE.

REFERENCES CITED

The following references are of record in the file of this patent:

UNITED STATES PATENTS

| Number | Name | Date |
| --- | --- | --- |
| 2,295,917 | Schwan | Sept. 15, 1942 |
| 2,319,921 | Dooley et al. | May 25, 1943 |
| 2,371,273 | Walker | Mar. 13, 1945 |
| 2,348,899 | Guignard et al. | May 16, 1944 |
| 2,345,620 | Mork | Apr. 4, 1944 |
| 2,304,443 | Butler | Dec. 8, 1942 |
| 2,349,335 | Baldwin | May 23, 1944 |
| 1,249,035 | Crosby | Dec. 4, 1917 |
| 2,268,689 | Andrus | Jan. 6, 1942 |
| 2,310,284 | Gurries | Feb. 9, 1943 |
| 2,389,029 | Crabtree | Nov. 13, 1945 |
| 1,848,979 | Stover et al. | Mar. 8, 1932 |